Patented Feb. 27, 1934

1,949,369

UNITED STATES PATENT OFFICE 1,949,369

PREPARATION OF DIALKYL SULPHATES

Henry L. Cox, South Charleston, W. Va., assignor to Carbide and Carbon Chemicals Corporation, a corporation of New York No Drawing. Application June 25, 1932
Serial No. 619,275

9 Claims. (Cl. 260—98)

My invention relates to the preparation of dialkyl sulphates from gaseous olefines, referring more specifically to a process for effecting this preparation.

It is known that when a gaseous olefine, that is, an olefine which is in the gaseous state at or near normal conditions of temperature and pressure, such as ethylene, propylene, or the butylenes, is brought into contact with concentrated sulphuric acid under suitable conditions, there is formed an acid liquor which contains alkyl hydrogen sulphate and dialkyl sulphate. Both the alkyl hydrogen sulphate and the dialkyl sulphate are soluble in the concentrated sulphuric acid liquor. To effect a separation of the dialkyl sulphate from the solution, two general methods have been proposed, namely, extraction with an immiscible solvent, or dilution of the acid with water whereby the dialkyl sulphate is thrown out of solution. Extraction with an immiscible solvent is impractical at the present time, since no suitable immiscible solvent is known. Benzene, ligroin, and ether have been suggested, but neither benzene nor ligroin dissolves dialkyl sulphates to any great extent, and ether is miscible in all proportions with the concentrated acid liquor.

Dialkyl sulphates are easily isolated by dilution of the acid liquor with water, provided that the liquor is formed by absorbing olefine in clean, pure sulphuric acid. However, under commercial plant operating conditions where the dilute acid remaining after the separation of alkyl compounds must, for the sake of economy, be reconcentrated and reused, the acid after a few cycles of use and reconcentration becomes dirty and has a carbon content of 0.1% or more. In the presence of an appreciable amount of this carbonaceous material the dialkyl sulphate forms a stable emulsion with diluted acid and does not readily settle out. Numerous attempts have been made to break this emulsion and separate out the dialkyl sulphate, but the problem is one of considerable difficulty.

I have found that certain solvent materials cause flocculation of the carbonaceous impurities in sulphuric acid liquor containing absorbed olefines. The flocculated impurities readily settle and may be removed by filtration, centrifuging, decantation, and similar known methods. The solvent may be recovered from the purified liquor by distillation, and the dialkyl sulphate may then be separated readily by dilution of the remaining clear liquor with water.

I have found that, in general, any solvent in which sulphuric acid, the alkyl hydrogen sulphate, and the dialkyl sulphate are readily soluble will cause the flocculation of the carbonaceous impurities. Water is not suitable because the dialkyl sulphate is insoluble in water and will form a stable emulsion with the impure liquor. Likewise, solvents in which the acid mixture is insoluble, such as benzene, hexane, pentane, chloroform, ethylene dichloride, etc., are not suitable since they do not flocculate the carbonaceous material. I have found that the volatile oxygen-containing solvents as a group are effective. Among these solvents, I have found that ethyl ether, isopropyl ether, methanol, ethanol, isopropanol, ethyl acetate, acetone, ethylene glycol monoethyl ether, and 1,4 dioxane are particularly effective. Of these, ethyl ether is the most volatile, and is therefore the most easily expelled by distillation from the clarified solution.

I prefer to use a volume of solvent at least twice that of the acid liquor to be purified, for, although a somewhat smaller volume of solvent has some flocculating effect, I have found that a volume ratio of at least two to one of solvent to liquor is required for satisfactory results. A somewhat higher volume ratio, such as about four or five to one, causes a more ready separation of floc and may often be desirable.

The process of my invention therefore includes the steps of absorbing one or more gaseous olefines in concentrated sulphuric acid which contains appreciable amounts of carbonaceous impurities, adding to the acid liquor so formed a solvent liquid comprising at least one volatile oxygen-containing solvent, preferably in a volume ratio of solvent to liquor of at least two to one, removing the carbonaceous impurities flocculated by this addition, removing the solvent by distillation from the thus purified liquor, separating dialkyl sulphate as an immiscible layer from the said liquor, and removing the separated dialkyl sulphate from the dilute acid mixture. The separation of dialkyl sulphate as an immiscible layer from the purified liquor may be accomplished by the addition of one or two volumes of water for each volume of liquor. The separated dialkyl sulphate may be removed from the diluted liquor by decantation or by similar means.

An incidental and added benefit to be derived from my invention is that the clarified acid gives less trouble from foaming and charring during she concentration process than acid which contains carbonaceous material.

I claim:

1. Process for preparing dialkyl sulphates from gaseous olefines which comprises the steps of absorbing the olefine in concentrated sulphuric acid which contains appreciable amounts of carbonaceous impurities, adding to the acid liquor so formed a solvent liquid comprising at least one volatile oxygen-containing solvent, removing the flocculated carbonaceous impurities, removing from the acid liquor said solvent, separating dialkyl sulphate as an immiscible layer from said liquor, and removing the separated dialkyl sulphate.

2. Process for preparing dialkyl sulphates from gaseous olefines which comprises the steps of absorbing the olefine in concentrated sulphuric acid which contains appreciable amounts of carbonaceous impurities, adding to the acid liquor so formed a solvent liquid comprising at least one of the group consisting of ethyl ether, isopropyl ether, methanol, ethanol, isopropanol, ethyl acetate, acetone, ethylene glycol monoethyl ether, and 1,4 dioxane, removing the flocculated impurities, removing from the acid liquor said solvent, separating dialkyl sulphate as an immiscible layer from said liquor, and removing the separated dialkyl sulphate.

3. Process for preparing dialkyl sulphates from gaseous olefines which comprises the steps of absorbing the olefine in concentrated sulphuric acid which contains appreciable amounts of carbonaceous impurities, adding to each volume of the acid liquor so formed at least about two volumes of a solvent liquid comprising at least one volatile oxygen containing solvent, removing the flocculated carbonaceous impurities, removing from the acid liquor said solvent, separating dialkyl sulphate as an immiscible layer from said liquor by adding water to the liquor, and removing the separated dialkyl sulphate.

4. Process for preparing dialkyl sulphates from gaseous olefines which comprises the steps of absorbing the olefine in concentrated sulphuric acid which contains appreciable amounts of carbonaceous impurities, adding to each volume of the acid liquor so formed at least about two volumes of a solvent liquid comprising at least one volatile oxygen-containing solvent, removing the flocculated carbonaceous impurities, removing from the acid liquor said solvent, separating dialkyl sulphate as an immiscible layer from said liquor by adding to each volume of the liquor approximately two volumes of water, and removing the separated dialkyl sulphate.

5. Process for preparing dialkyl sulphates from gaseous olefines which comprises the steps of absorbing the olefine in concentrated sulphuric acid which contains appreciable amounts of carbonaceous impurities, adding to each volume of the acid liquor so formed at least about four volumes of a solvent liquid comprising at least one volatile oxygen-containing solvent, removing the flocculated carbonaceous impurities, removing from the acid liquor said solvent by distillation, separating dialkyl sulphate as an immiscible layer from said liquor by adding water to the liquor, and removing the separated dialkyl sulphate.

6. Process for preparing diethyl sulphate from ethylene which comprises the steps of absorbing the ethylene in concentrated sulphuric acid which contains appreciable amounts of carbonaceous impurities, adding to each volume of the acid liquor so formed at least about two volumes of ethyl ether, removing the flocculated carbonaceous impurities, removing from the acid liquor said ether by distillation, separating diethyl sulphate as an immiscible layer from said liquor by adding water to the liquor, and removing the separated diethyl sulphate.

7. Method of flocculating carbonaceous impurities from concentrated sulphuric acid liquor which contains in addition to said impurities absorbed gaseous olefine, which comprises adding to said acid at least one volatile oxygen-containing solvent.

8. Method of flocculating carbonaceous impurities contained in concentrated sulphuric acid liquor which also contains absorbed gaseous olefine, which comprises adding to each volume of acid liquor at least about two volumes of at least one solvent of the group consisting of ethyl ether, isopropyl ether, methanol, ethanol, isopropanol, ethyl acetate, acetone, ethylene glycol monoethyl ether and 1,4 dioxane.

9. Method of flocculating carbonaceous impurities contained in concentrated sulphuric acid liquor which also contains absorbed ethylene, which comprises adding to each volume of said acid liquor at least about four volumes of ethyl ether.

HENRY L. COX.